Patented Jan. 16, 1934

1,943,856

UNITED STATES PATENT OFFICE 1,943,856

DENTAL PREPARATION

Roy Cross, Kansas City, Mo., assignor to Silica Products Company, Kansas City, Mo., a corporation of Delaware No Drawing. Application July 10, 1929
Serial No. 377,330

5 Claims. (Cl. 167—93)

This invention relates to the production of a dental preparation having certain cleansing, preservative and hardening properties for the teeth, gums and mouth. It includes certain substances not ordinarily found in preparations of this sort, mixed in such way and capable of reacting upon the teeth in such way as to preserve the normal constitution of the teeth and to take care of some of the elements frequently deficient. Desirable detergent, curative and cleansing properties are given by the use of a gel-producing agent of which bentonite is a type. The correct alkalinity or hydrogen ion concentration is given by the use of magnesium oxide. Hardening properties are given in part by the use of sodium fluoride. The combination of magnesium oxide and sodium fluoride is particularly valuable in my dental preparation. Phosphates are also of great value in maintaining tooth integrity in the form of alkali phosphate. Sodium fluoride also prevents decay. Additional cleansing properties are also given, if desired, by the use of soap powder. Proper tonicity, together with antiseptic, sedative, soothing or anaesthetic and healing properties are given by the substances of the nature of eucalyptol and camphor. Astringent properties are given by the use of benzoin. Water may be used as a vehicle to give a paste of suitable consistency.

The bentonite is advantageously made by diluting commercial bentonite with a large excess of water. The colloidal water suspension is then allowed to dry under a vacuum or at low temperature to prevent any deterioration in the gel producing value. This dried and powdered residue is used in connection with this preparation.

A typical formula is the following:

| | Parts |
|---|---|
| (1) Bentonite, prepared as above | 50 |
| (2) Magnesium oxide | 50 |
| (3) Sodium fluoride | 1 |
| (4) Sodium phosphate | 5 |
| (5) Soap powder | 5 |
| (6) Oil of eucalyptus | 1 |
| (7) Gum camphor | 1 |
| (8) Tincture of benzoin | 5 |
| (9) Water in sufficient quantity to give a paste of the right consistency. | |

(5), (4) and (3) may be eliminated, if desired. In making this preparation, the bentonite, magnesium oxide and soap powder are thoroughly mixed together. The eucalyptol, camphor and tincture of benzoin are thoroughly dissolved in each other. The sodium fluoride is dissolved in the water, and the three mixtures are then combined into one and worked into a paste of suitable consistency. Water may be omitted, using practically the same formula to produce a dry dental preparation.

Claims:

1. A dental cream comprising bentonite, magnesium oxide, sodium fluoride, camphor and benzoin.

2. A dental preparation comprising bentonite and a small proportion of magnesia.

3. A dental cream comprising bentonite in the form of a gel, magnesia and tincture of benzoin.

4. A dental preparation comprising bentonite and magnesia in paste form.

5. A dental preparation comprising bentonite and magnesia in paste form and in about equal proportions by weight.

ROY CROSS.